Feb. 16, 1932.  G. H. PHELPS  1,845,328
METHOD OF MAKING RADIATORS
Filed Sept. 17, 1929
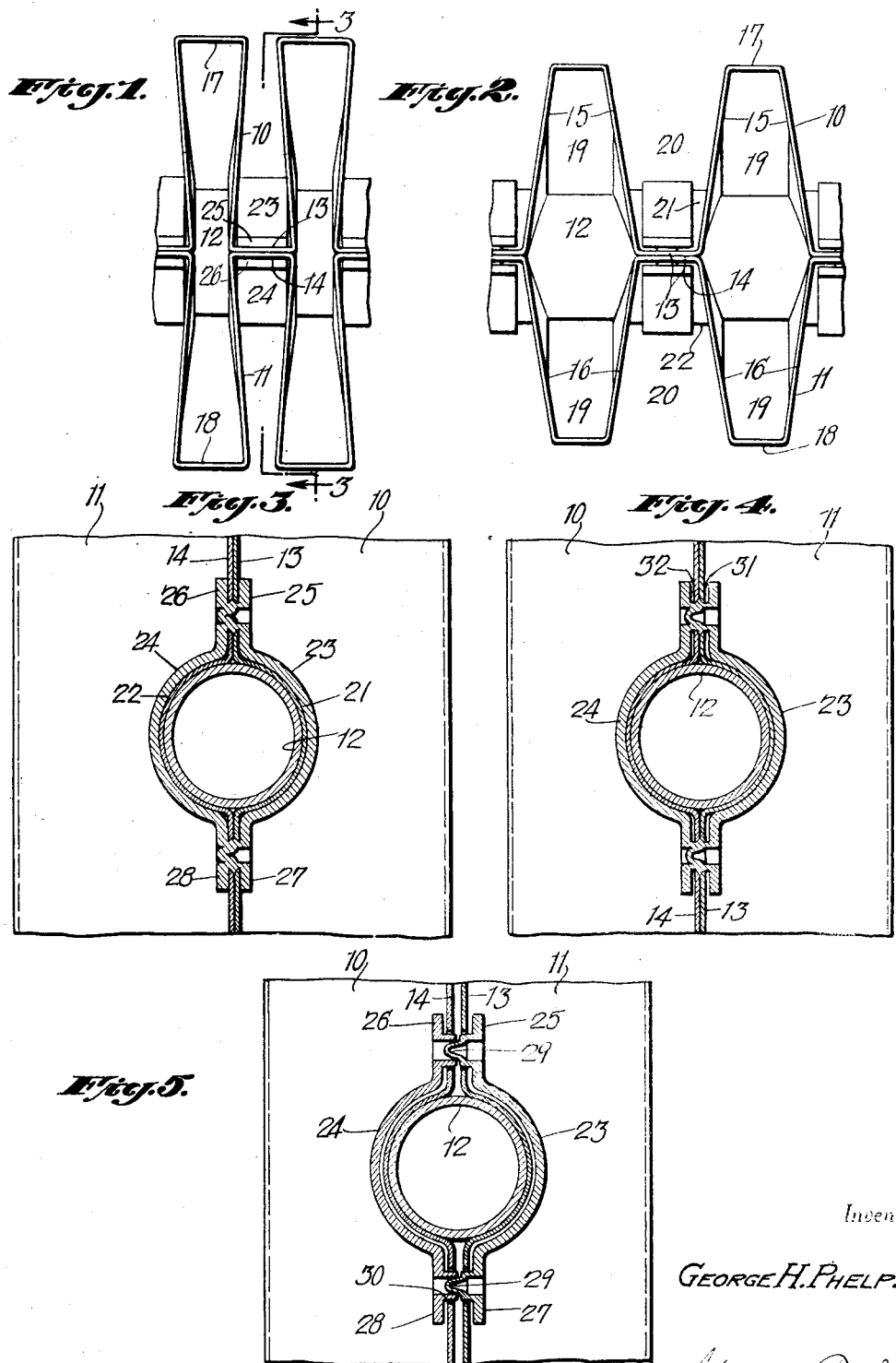
Inventor
GEORGE H. PHELPS.
Attorneys Patented Feb. 16, 1932

1,845,328

UNITED STATES PATENT OFFICE

GEORGE H. PHELPS, OF WAREHOUSE POINT, CONNECTICUT, ASSIGNOR TO MURRAY RADIATOR CORPORATION, OF BROOKLYN, NEW YORK, A CORPORATION OF NEW YORK

METHOD OF MAKING RADIATORS

Application filed September 17, 1929. Serial No. 393,158.

This invention relates to a method of making radiators having conducting fins or plates to conduct heat from a heating element to the surrounding atmosphere or to withdraw the heat from an atmosphere to be cooled to the heat receiving element. More particularly the invention relates to a method of making radiators of the general type disclosed in the patent to Thomas E. Murray, No. 1,750,643, granted March 18, 1930.

In radiators of the above type, fins or plates having corrugations are mounted on opposite sides of a pipe or other tubular heat element in such a manner as to conduct the heat between the heat element and the surrounding atmosphere. The fins or plates are secured to the heat element by means of straps or clips, which are placed about the part of the plate adjacent the heat element and are then welded and pressed together to tightly hold the plates.

In securing the fins, or heat distributing plates, to the heating or heat abstracting element the straps were heretofore welded and compressed in a single operation, or by a quick succession of operations, in the welding machine. This necessitated a heavy pressure on the copper electrodes used in welding, causing a more rapid wear on these electrodes than would result from the welding operation alone. This wearing of the electrodes also tended to decrease the tightness with which the straps are pressed and to thereby cause a lack of uniformity in the tightness with which the fins or plates are clamped on the heat element.

In the method heretofore used in which the welding and tightening of the heat distributing plates on the heat element was accomplished in a single operation the shape of the corrugated plate used in making the fins and the shape and arrangement of the welding electrodes determined the spacing of the radiating fins or heat distributing areas along the length of the heat element. This necessitated a special electrode, corrugated for each different spacing of the fins on the heat element. Moreover, if a compressing operation were employed it would be difficult, if not impossible, to obtain a spacing of less than a minimum distance as for example less than the distance between successive corrugations.

An object of my present invention is to provide a method of mounting radiating plate areas on a heat element in which the plates may be welded on the heat element and in a separate, later, operation tightened or clamped into fixed relation on the heating or heat abstracting element.

Another object of the invention is to provide a method of making radiators having corrugated heat distributing surfaces in which any desired spacing of the distributing areas of a heat element may be obtained with a single electrode or adjustment of an electrode and with the use of a plate of standard or uniform corrugations.

Other features and objects of the invention are: to provide a method of forming radiators of the above type in which the wear on the welding electrodes for securing the plates to the heat element may be minimized; to secure the mounting of the radiating areas on the heat element with a uniform tightness; to enable the positions of the transferring areas to be adjusted on the heat element after welding; and to provide a radiator having radiating areas more closely spaced on a heat element than the width of corrugations from which said areas are formed.

The various features of the invention are illustrated in the accompanying drawings. In which:—

Fig. 1 is a plan view of a portion of a radiator embodying a preferred form of the invention;

Fig. 2 is a similar view of a portion of a radiator in the process of construction showing the heat radiating or transfer plates secured on the heat element by straps or clips welded together and prior to the shifting or adjusting of the plates and clamping in position;

Fig. 3 is a cross sectional view of a portion of a finished radiator taken on line 3—3 of Fig. 1;

Fig. 4 is a similar view of a portion of a radiator in process of construction in which the heat distributing plates have been welded in position, but not tightened;

Fig. 5 is a section similar to that of Fig. 3 before the welding of the plates on the heat element but showing the various elements in position for welding.

In forming a radiator according to my invention a pair of corrugated plates 10 and 11 are placed on opposite sides of an elongated or tubular heat element 12. The heat element 12 may be used to supply heat to the surrounding atmosphere and for this purpose may be heated with steam or other heating fluid or by electricity, or it may be used as a cooling element to abstract heat from the surrounding atmosphere. The plates 10 and 11 are corrugated to form areas 13 and 14, respectively, which abut or contact on opposite sides of the heat element 12, and areas 15 and 16 that extend outwardly from the areas 13 and 14, respectively. The outer edges of the areas 15 and 16 are bridged or joined by means of areas 17 and 18 thereby forming alternate inner and outer channels 19 and 20 on each side of the heat element 12.

The plates 10 and 11 are rounded at the inner sides of the channels 20 to form semi-circular areas 21 and 22 transverse to the channels and adapted to fit and receive the heat element 12, when the plates are brought into position on the heat element. The areas 21 and 22 thus tightly fit the heat element 12 forming a heat conducting path from the surface of the heat element to the distributing areas 15 and 16.

The plates 10 and 11 are secured to the heat element 12 by straps or clips 23 and 24, one on each outer surface of the areas 21 and 22. The clips 23 and 24 have upper and lower ears 25 and 26 and 27 and 28, respectively, which overlie adjacent portions of the areas 13 and 14. The ears 25 and 27 have hollow projections 29, which extend into correspondingly flanged openings 30 in the ears 26 and 28. The areas 13 and 14 of the plates 10 and 11 may be suitably pierced to receive the projections 29 and flanges of the openings 30, as indicated in Fig. 5.

In welding the clips or straps 23 and 24 in position to secure the plates 10 and 11, a welding current is passed between the projection 29 and the flanged opening 30 while a pressure is applied to cause the metal at these points to soften and fuse together. In the take-up of the metal the semi-circular portions 23 and 24, of the straps, or clips, are brought closely against the outer surface of the grooved areas 21 and 22, but without tightly clamping these areas against the outer surface of the heat element 12. The take-up of the metal in the welding operation brings the areas 25 and 27 and 26 and 28, respectively, into closely spaced relation to the outer surfaces of the plate areas 13 and 14, but leaves slight spaces to be taken up in the subsequent tightening operation. In the welding of the straps, or clips, 23 and 24 the projections 29 and flanged perforations of the ears of the clips are welded into the form of a hollow rivet, as shown in Fig. 4.

After the plates have been thus placed in position on the heat element 12 and the straps 23 and 24 welded together, the side or distributing walls 15 and 16 of the corrugated plates have the standard spacing as shown in Fig. 2. To attain any desired spacing, either a closer or wider spacing of the plate areas 15 and 16, the welded straps 23 and 24 are shifted longitudinally on the heat element 12 to the desired spacing and are then compressed to clamp the plates in their spaced position. In the clamping operation the ears 25 and 26 and 27 and 28 are compressed between steel dies until they have been brought against the plate areas 13 and 14 with the desired pressure. This pressure will be sufficient to hold the plates in their adjusted position on the heat element. As a result of this compression the spaces 31 and 32 between the ears of the strap and the adjacent plate areas 13 and 14 entirely disappear, the ears and plates taking the contact position shown in Fig. 3. Inasmuch as heat is not required during the compressing operation it is not necessary to use a metal of high conductivity, such as copper. Hardened steel dies may therefore be used to resist the impact and pressure and by maintaining their surfaces without appreciable wear ensure the same degree of pressure for successive compressing operations.

While the invention has been illustrated as applied to the Murray type of radiator it will be evident that it may be used for securing various types of heat radiating fins to a heat element. The heat element may be used either for the giving up or dissipation of heat to the surrounding atmosphere, as in the heating of rooms by steam or other heating fluid, or it may act as a heat abstracting element for cooling atmosphere, or for the purpose of distributing heat from a heat supplying atmosphere.

What I claim is:

1. A method of making radiators of the type described which comprises, placing plates on opposite sides of a heat element received in transverse recesses in the plates, welding together clips in pairs on the outer surfaces of said plates on opposite sides of said recess portions and then tightening the clips of said pairs about said plates to clamp said plates to said heat element.

2. A method of making radiators of the type described which comprises, placing corrugated plates on opposite sides of a tubular heat element with said heat element received in transverse recesses in the adjacent ridges of opposite plates, welding clips together in pairs at opposite sides of the heat element and then tightening said clips of said pairs by pressing them on said element.

3. A method of making radiators of the type described which comprises, placing corrugated plates on opposite sides of a tubular heat element with said heat element received in transverse recesses in the adjacent ridges of opposite plates, welding clips on opposite sides of said recessed parts of said plates through said plates on opposite sides of said heat element, said welded portions of said clips being slightly spaced from each other and thereafter compressing said clip together to tighten said clips on said heat element.

4. A method of welding heat dissipating or receiving metal sheets at an angle on a heat element which comprises placing said sheets on said heat element with surfaces embracing said heat elements, welding clips about said embracing surfaces and pressing said clips on said heat element after welding.

5. A method of forming radiators of the type described which comprises placing heat conducting and distributing areas of sheet metal on a heat element, uniting them loosely to said heat element, and thereafter adjusting their position and fastening them tightly on the heat element in such adjusted position.

6. A method of forming radiators of the type described which comprises placing heat conducting and distributing areas of sheet metal on a heat element, uniting them loosely to said heat element, adjusting them closer to each other along the heat element, and fastening them tightly on the heat element in such adjusted position.

7. A method of forming radiators of the type described which comprises placing heat conducting and distributing areas of sheet metal on a heat element and with surfaces embracing said heat element, welding a clip about said surfaces, sliding said areas to an adjusted position on said heat element and tightening them thereon.

8. A method of forming radiators of the type described which comprises positioning a pair of corrugated plates on opposite sides of an elongated heat element, the corrugations of said plates being transverse to the length of said heat element and having surfaces to receive said element, welding clips together to embrace the areas of said plates about said heat element, sliding said clips and the embraced parts of the plates to spaced positions on said heat element, and fixing them in position thereon.

9. A method of forming radiators of the type described which comprises positioning a pair of corrugated plates on opposite sides of an elongated heat element, the corrugations of said plates being transverse to the length of said heat element and having surfaces to receive said element, welding clips together to embrace the areas of said plates about said heat element, sliding said clips and the embraced parts of the plates to spaced positions on said heat element, and fixing them in position thereon by compression.

10. A method of forming radiators which comprises positioning plate areas transversely of a heat element, engaging said plates by a pair of straps embracing said element, welding said straps through said plates on opposite sides of said element by a rivet shaped weld and with the weld supporting areas slightly spaced, sliding said plate areas to adjusted positions on said element, and pressing the weld supporting areas together to clamp said areas on said element.

11. A method of forming radiators which comprises positioning plate areas transversely of a heat element, engaging said plates by a pair of straps embracing said element, welding said straps through said plates on opposite sides of said element by a rivet shaped weld and with the weld supporting areas slightly spaced, and pressing the weld supporting areas together to clamp said areas on said element.

In witness whereof I have hereunto signed my name.

GEORGE H. PHELPS.